United States Patent [19]

Roujon

[11] Patent Number: 4,669,446

[45] Date of Patent: Jun. 2, 1987

[54] WIRE SAWS FOR THE SHAPING OF STONE, GRANITE AND THE LIKE

[76] Inventor: Auguste Roujon, 28 place F. Compaire, 12100 Millau, France

[21] Appl. No.: 869,013

[22] Filed: May 28, 1986

[30] Foreign Application Priority Data

Apr. 6, 1985 [FR] France .................. 85 08512

[51] Int. Cl.$^4$ ............................................ B28D 1/30
[52] U.S. Cl. .................................. 125/21; 125/16 R
[58] Field of Search .................................. 125/16 R, 21

[56] References Cited

U.S. PATENT DOCUMENTS

| | | | |
|---|---|---|---|
| 1,017,207 | 2/1912 | Eggers | 125/21 |
| 1,706,406 | 3/1929 | Legge | 125/21 |
| 2,674,238 | 4/1954 | Dessureau | 125/21 |
| 2,803,239 | 8/1957 | D'Avaucourt | 125/21 |
| 2,866,448 | 12/1958 | Dressureau et al. | 125/21 |
| 2,924,050 | 2/1960 | Barron | 125/21 |
| 3,158,146 | 11/1964 | Allen | 125/21 |
| 3,490,815 | 1/1970 | Poston | 308/3.5 |

FOREIGN PATENT DOCUMENTS 0124464 11/1984 European Pat. Off. .
3118505 2/1983 Fed. Rep. of Germany .

*Primary Examiner*—Harold D. Whitehead
*Attorney, Agent, or Firm*—Young & Thompson

[57] ABSTRACT

The present invention concerns improvements in wire saws for the shaping of stone, granite and the like and more particularly the wire saw described in the U.S. patent application 604,520 of the same applicant.

The wire saw that is the object of the improvements comprises a vertical fixed frame (1) in which is displaced in translation a movable chassis (2) and a block-carrying carriage (4) movable in horizontal translation beneath the fixed frame (1) and comprising a guide panel (18) in which is displaced a guide arm (14) fixed to the movable chassis (2). The improvements according to the present invention are characterized in that the block-carrying carriage (4) is provided, for its displacement, with mechanical means actuated by a counterweight (21) and a variable speed mechanical automatic advance system coupled to the said mechanical means so as to impart to the displacement of the said carriage a maximum speed.

15 Claims, 12 Drawing Figures

WIRE SAWS FOR THE SHAPING OF STONE, GRANITE AND THE LIKE

The present invention has as an object improvements in wire saws for the shaping of stone, granite and the like as described in U.S. patent application No. 604,520 of the same applicant and now U.S. Pat. No. 4,566,428, issued Jan. 28, 1986.

The wire saw as described in that application is constituted by a fixed vertical frame in which a movable chassis carying wire pulleys is displaced in vertical translation, and a block-carrying carriage movable in horizontal translation beneath the fixed frame and comprising a vertical guide panel in which is displaced the extremity of a guide arm fixed to the vertical movable chassis.

The sawing of the shape is obtained by the combination of a vertically downward movement of the movable chassis and a horizontal translation movement of the block-carrying carriage.

The form of the desired shaping of the block is given by the guide panel fixed to the block-carrying carriage in which is displaced the guide arm of the vertically movable chassis.

The wire saw as described in the above-mentioned U.S. application gives good results, but for certain forms of shaping some disadvantages appear in the course of operation.

Specifically, the control for displacement of the block-carrying carriage in one direction or the other is assured by the action of a counterweight and a mechanical driving and reduction system. The counterweight is for assuring, with an appropriate load, the advance of the carriage according to the load that the said carriage transports, but does not allow this advance to be regulated in a precise manner.

In fact it requires a load greater than the counterweight so that the carriage may advance when the extremity of the guide arm is disposed over a steeply inclined portion of the profile of the shaping provided in the guide panel; but in this case, the speed of displacement increases and becomes too great when the profile angle of the guide panel approaches the horizontal.

Another disadvantage of the wire saw of the U.S. application is that it has been verified that the approach of the wire pulleys near the block to be sawed was note yet sufficient to relieve the bending to which the wire is subjected at the time of descent of the vertical carriage.

Another disadvantage similarly appeared at the time of operation of the wire saw, in the region of the guide arm, according to the above-referenced patent application.

Specifically, at the time of displacement of the block-carrying carriage, a lateral displacement of the extremity of the guide arm in the guide panel is produced, which may cause the spiralling of the guide arm and thus defects in the form of the shaping obtained on the block relative to the profile of the guide panel.

The improvements according to the present invention overcome these disadvantages by permitting the block-carrying carriage to obtain a maximum speed that is variable according to the resistance of the material to be sawed, while avoiding any bending of the wire during sawing and eliminating any possible lateral displacement of the guide arm in the guide panel.

Specifically, the improvements according to the invention are characterized in that the block-carrying carriage is provided, for its displacement, with mechanical means actuated by a counterweight and a variable-speed, mechanical automatic advance system connected to the said mechanical means so as to impart to the displacement of the said carraige maximum speed according to the resistance of the material to be sawed.

According to another improvement according to the invention, between the wire pulleys carried by the arm fixed to the movable chassis and the block to be sawed are disposed anti-bending systems permitting maintaining the wire in line during sawing.

According to another characteristic of the improvements according to the invention, the wire saw comprises means for maintaining and guiding the guide arm so as to avoid lateral displacements of this latter in the guide panel.

Other advantages and characteristics will appear from reading the following description illustrated by the accompanying drawings given by way of non-limiting example, and in which.

Figure 1:
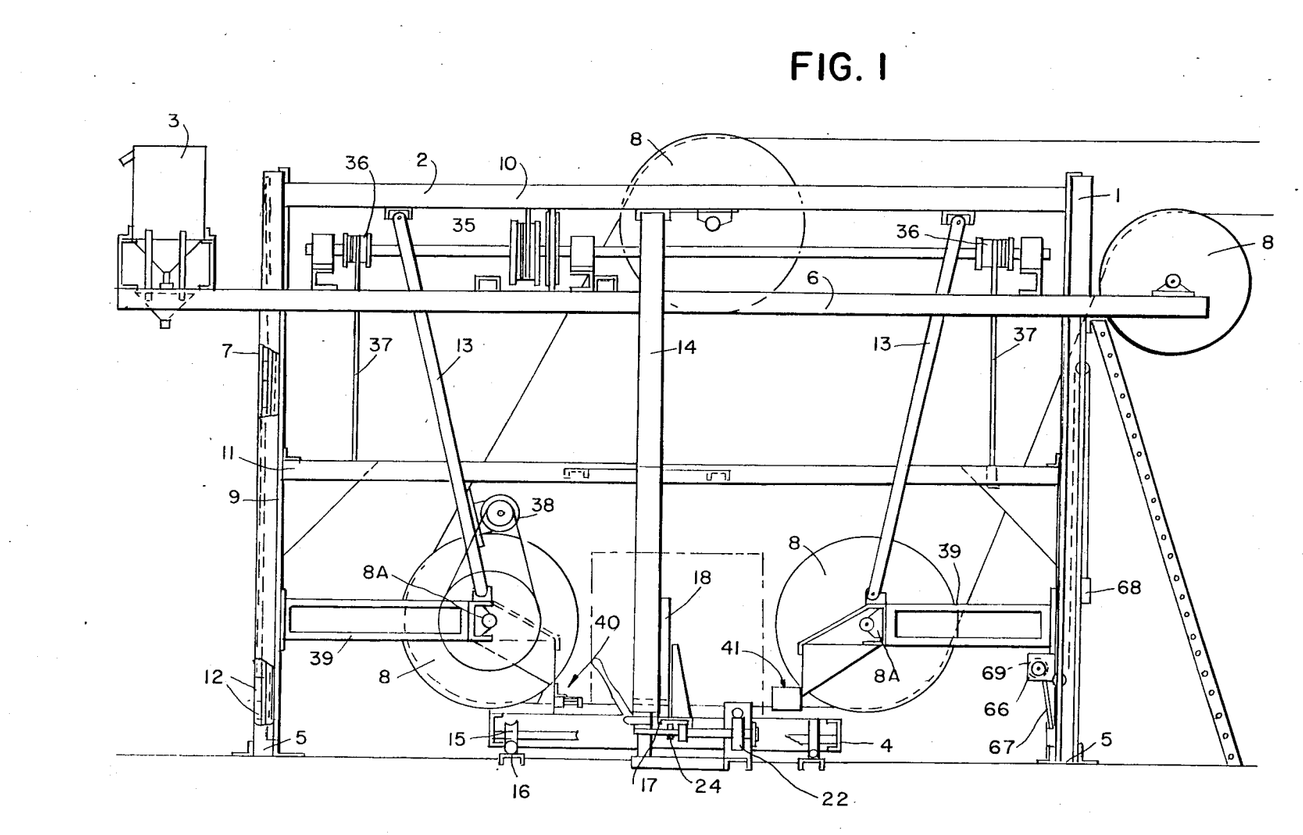
FIGS. 1, 2 and 3 are front, side and top views, respectively, of the wire saw having improvements according to the invention.
Figure 2:
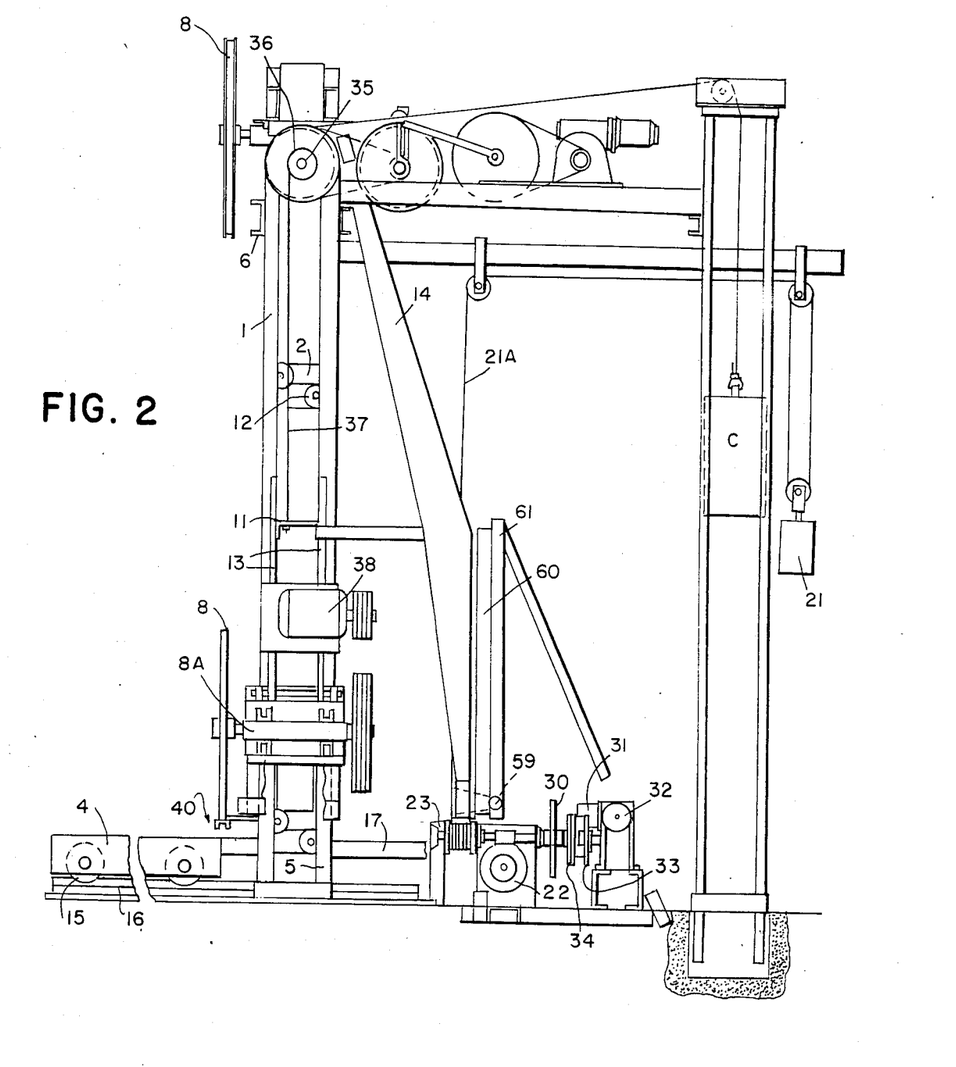
Figure 3:
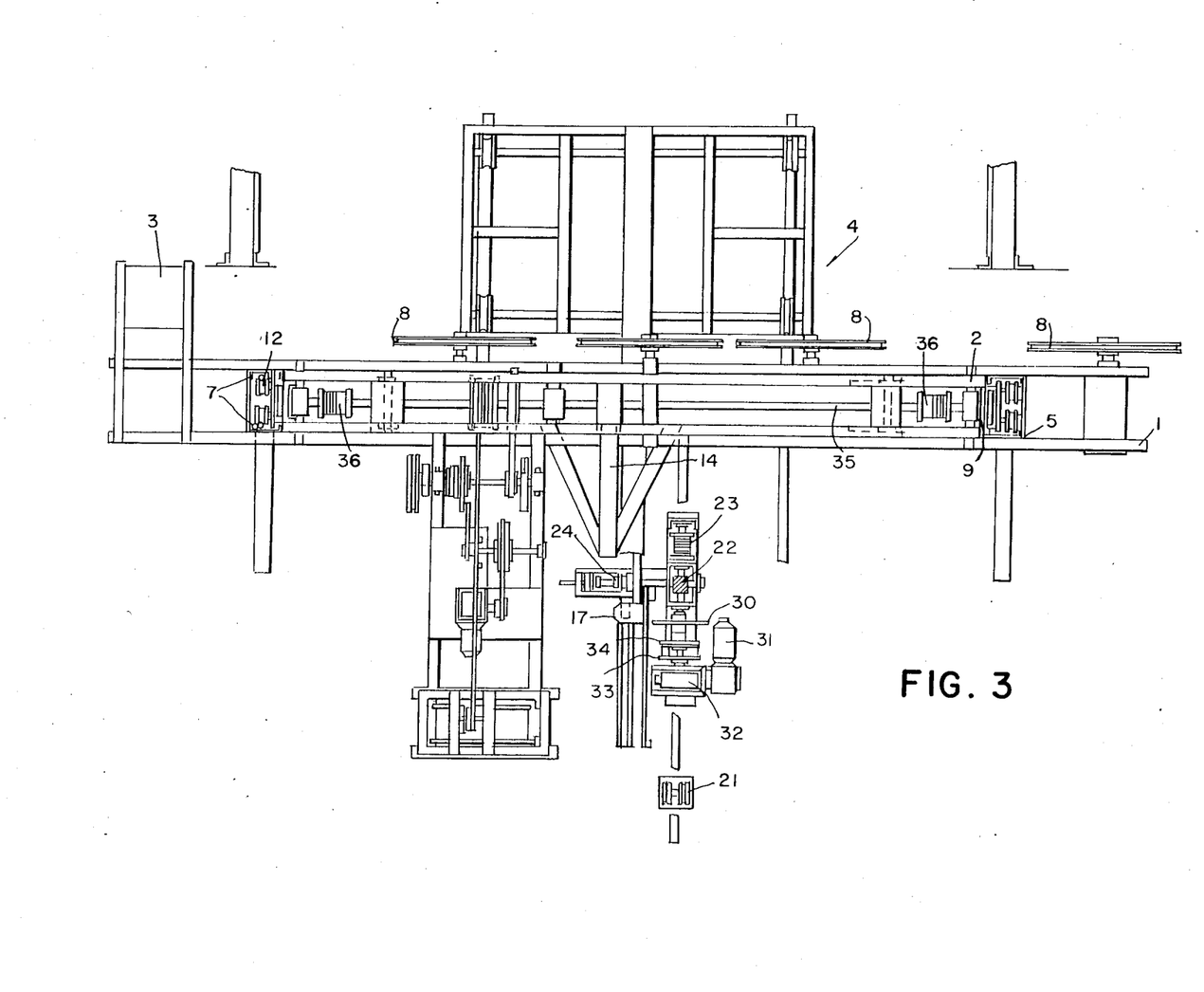

The wire saw for shaping stone, granite and the like, object of the improvements according to the present invention and shown in FIGS. 1, 2 and 3 comprises as described in the U.S. patent application No. 604,520, a fixed vertical frame 1, a vertical chassis 2 movable in translation in the said fixed frame, a wire tensioning device, a pump, and an apparatus 3 for distribution of abrasive, a block-carrying, horizontal carriage 4 movable in translation beneath the movable chassis 2.

The fixed frame 1 is constituted by two parallel, vertical uprights 5 interconnected by a crossbar 6, in which said uprights are fixed slides 7. On the extremities of the crossbar 6 is fixed on the one hand, the apparatus 3 for distribution of abrasive and on the other hand a wire pulley 8.

The movable chassis 2 is constituted of two parallel beams 9 interconnected by an upper crosspiece 10 and by an intermediate crosspiece 11. The beams 9 comprise friction rollers 12 adapted to roll in the slides 7 of the fixed frame 1.

On the upper crosspiece 10 are fixed a wire pulley 8, two arms 13 articulated on the said crosspiece and each carrying at their extremity a wire pulley 8, and a guide arm 14 advantageously also supported on the intermediate cosspiece 11. Between the uprights 5 of the fixed frame 1 is disposed the block-carrying carriage 4. The said block-carrying carriage is provided with friction rollers 15 rolling in slides 16 fixed to the ground and comprises a beam 17. On the said beam is fixed the guide panel 18 as described in the U.S. patent application mentioned above.

The guide panel 18 comprises an opening 19 having a profile of the shaping to be obtained on the block carried by the carriage 4 and in which is placed the extremity of the guide arm 14 provided with a rolling mechanism 20.

The sawing of the shaping is obtained by the combination of a vertically downward motion of the movable chassis 2 and a horizontal translation motion of the block-carrying carriage 4.

The control for the displacement of the block-carrying carriage in one direction or the other is assured by means, preferably mechanical, actuated by a counterweight 21.

According to a first improvement according to the invention of the wire saw for shaping, the block-carrying carriage 4 is provided, for its displacement, with mechanical means actuated by the counterweight 21 and a variable speed mechanical automatic advance system coupled to the said mechanical means so as to impart to the displacement of the said carriage a maximum speed according to the machining characteristics of the material to be sawed.

Figure 10:
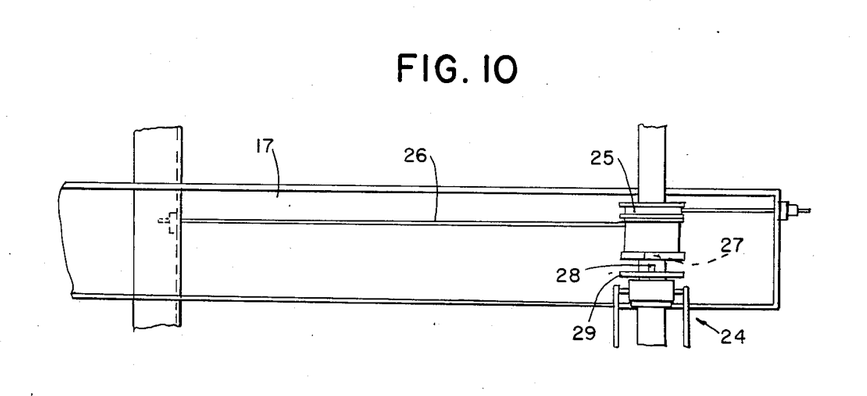
FIG. 10 is a top view of the drive means for the block-carrying carriage.

As described in the U.S. patent application 604,520, the mechanical means actuated by the counterweight 21 are constituted by a worm gear 22, a drum 23 fixed to the shaft of the worm of the said worm gear and on which is wound the cable 21A supporting the counterweight 21; a drive device for the carriage 4 mounted on the shaft of the worm wheel of the worm gear 22 and by a coupling 24 mounted on the shaft of the said worm wheel for disconnecting the drive device of the carriage from the worm gear.

According to a preferred embodiment the drive device of the carriage fixed to the shaft of the worm wheel of the worm gear is, following an improvement according to the invention, constituted by a drum 25 mounted on rollers on the shaft of the said worm wheel and by a cable 26 wound on the drum 25 and fixed by its extremities on the extremities of the beam 17.

A plurality of openings 27 is provided in a side plate of the drum 25, these openings cooperating with pins 28 mounted on a plate 29 forming part of the coupling 24.

Advantageously, a hand wheel 30 is mounted on the shaft of the worm of the worm gear 22, permitting the winding of the cable 21A of the counterweight 21 when the coupling 24 is disconnected and permitting the pins 28 of the coupling 24 to be placed opposite the openings 27 of the drum 25 prior to reconnecting.

The disconnection of this drum 25 is indispensable for rapidly displacing the carriage, or, if desired, reversing the winding of the cable 21A on the drum 23 in the case of changing the direction of translation of the block-carrying carriage 4.

The variable speed, mechanical automatic advance system is coupled to the mechanical means actuated by counterweights on the shaft of the worm of the worm gear 22.

This mechanical advance system is constituted according to a preferred embodiment by a moto-reducer 31 coupled to a reducer 32 the output shaft of which is coaxial with the shaft of the worm of the worm gear 22, a friction coupling 33 one part of which is slidably mounted on the shaft of the reducer 32 and a disc 34 fixed on the shaft of the worm.

The part of coupling 33 placed on the shaft of the reducer 32 slides on this shaft and comes to bear against the disc 34 under the action of drive springs as well as the carriage so long as no obstacle opposes its advance.

In the case of resistance caused by the shape of the guide panel 18, the support of the coupling 33 slips on the disc 34 thus realizing the differential speed at the control of the guide panel 18.

Advantageously, the side plates of the drum 23 are formed with ratchets for blocking said drum with the aid of pawls if necessary, and thus avoiding any displacement in one direction or the other.

The mechanical means actuated by the counterweight 21 prevent too great a pressure on the friction coupling 33 and facilitate the commencement of coupling after a prolonged slipping. The assembly of the reducers of the automatic advance system and the mechanical means impart to the block-carrying carriage 4 a maximum speed of displacement.

In the case where the maximum speed would be too great for certain vary hard granites, or insufficient for other less hard materials, a speed variator (not shown) may be interposed between the output of the reducer 32 and the friction coupling 33 so as to increase or decrease the maximum speed, as the case may be.

Thus whatever may be the shape of the profile provided on the guide panel 18, the block-carrying carriage 4 advances at a maximum speed when the extremity of the guide arm is disposed on a slope of inclination less than 45° and at a differential speed when it is disposed on a slope greater than 45°.

The same is true for the movable chassis 2 which is provided with an automatic descent system permitting a differential speed of descent to be obtained.

The means used in this automatic descent system are as describd in the above-referenced U.S. patent application.

Nevertheless, following another improvement according to the invention, the shafts carrying the means of this automatic descent system are disposed parallel to the shaft 35 mounted on the fixed frame and at the end of which are fixed the drums 36 on which are wound the cables 37, the extremities of which are fixed on the intermediate crosspiece 11 of the movable chassis 2.

Moreover, the driving between the various means of the descent system is not realized by gears which could cause jamming, but by belts or Galle chains as shown in FIGS. 1, 2 and 3.

The arms 13 are articulated on the upper crosspiece, on which arms are mounted the wire pulleys 8 in bearing blocks 8A. On one of the arms 13 is fixed the drive motor 38 for the sawing wire.

As described in the U.S. patent application, the arms 13 are adapted to draw the pulleys 8 nearer to the block to be sawed and to this end, telescoping connecting members 39 are disposed between the beams 9 of the movable chassis 2 and the bearing blocks 8A. It has been established that this bringing nearer of the pulleys 8, although efficient, would not be sufficient.

Thus, according to another improvement according to the invention of the wire saw for shaping, anti-bending systems 40 and 41 are disposed between the wire pulley 8 carried by the arm 13 and the block to be sawed, which permit maintaining the wire in line during the sawing.

The anti-bending system 40 disposed at the entrance of the sawing wire in the block to be sawed is preferably different from that disposed at the exit of the wire from the block for reasons which will be explained later.

Figure 4:
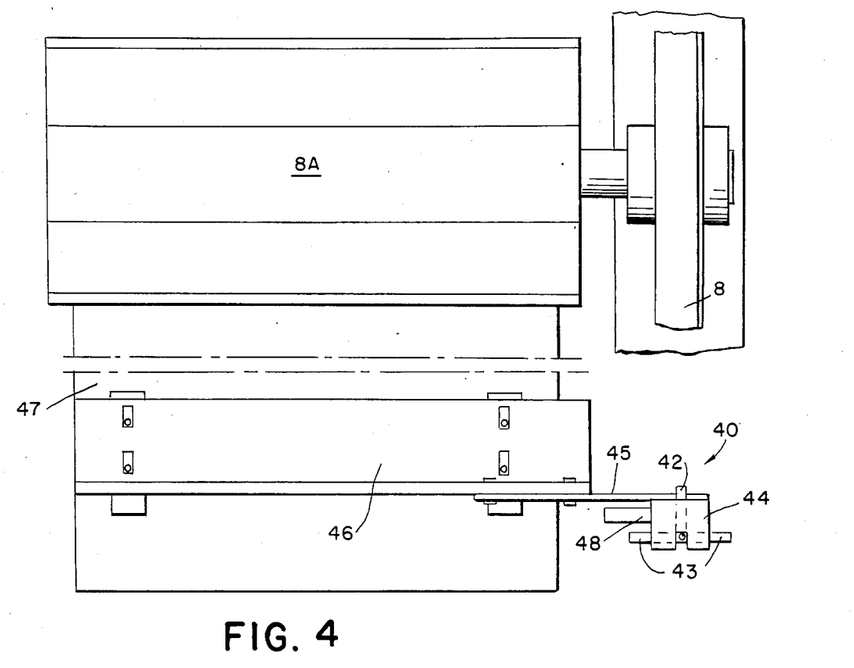
FIGS. 4 and 5 are front and side views, respectively, of an anti-bending system according to the invention.
Figure 5:
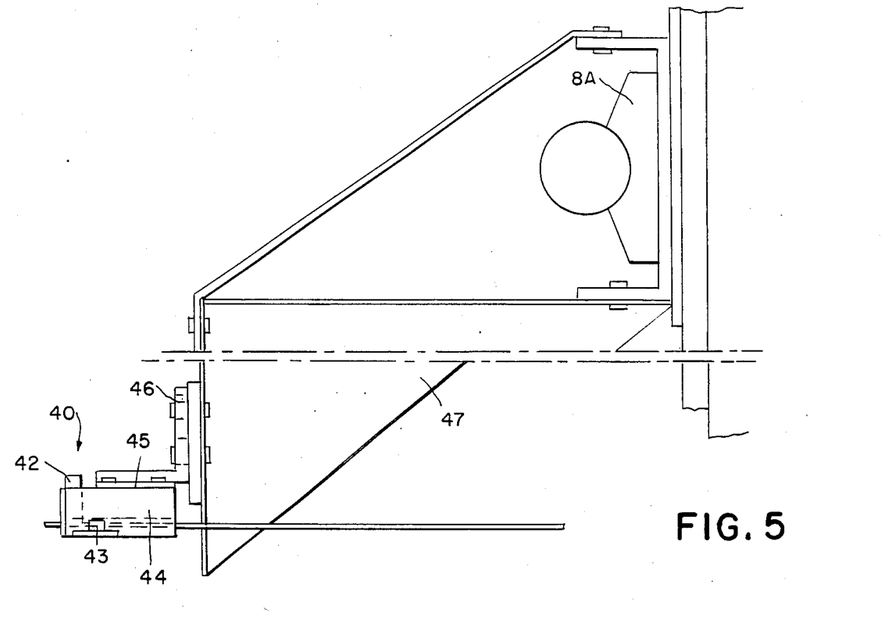

The anti-bending system 40 disposed at the entrance side of the sawing wire into the block to be sawed is constituted of a small vertical plate 42 beneath which the wire comes to bear, two small lateral plates 43 symmetrically disposed with respect to the small plate 42 and perpendicular to this latter, a support 44 for the small plates mounted on the stage 45 fixed on an angle iron 46 and a plate 47 fixed on the support of the bearing block 8A and on which is mounted the angle iron 46.

As shown in FIGS. 4 and 5, the said angle iron 46 may be adjusted in height so as to adjust the pressure of the small plate 42 on the sawing wire. The stage 45 may similarly be adjusted along its longitudinal direction for disposing the small plates 43 symmetrically about the wire.

The vertical small plate 42 also avoids the upward displacement of the wire and thus avoids any bending and the small plates 43 prevent any lateral displacement of the wire during the sawing. Advantageously the small plates 42 and 43 are of a very long-wearing metal, preferably tungsten. Moreover, a supply of water 48 is necessary so as to avoid heating of the plates. It will be readily understood that the plate support 44 must be as close as possible to the block to be sawed.

However, if this anti-bending system 40 is efficient for the entrance side of the wire and without great consequence for the wearing of the plates, it is preferable not to use it on the exit side of the wire. In fact, at the exit from the block to be sawed the wire entrains with itself a small quantity of abrasive which causes the formation of a furrow on the small plate which is worn more rapidly.

So as to overcome this advantage, an anti-bending system 41 is disposed at the exit of the wire from the block to be sawed, between the said block and the wire pulley 8.

Figure 6:
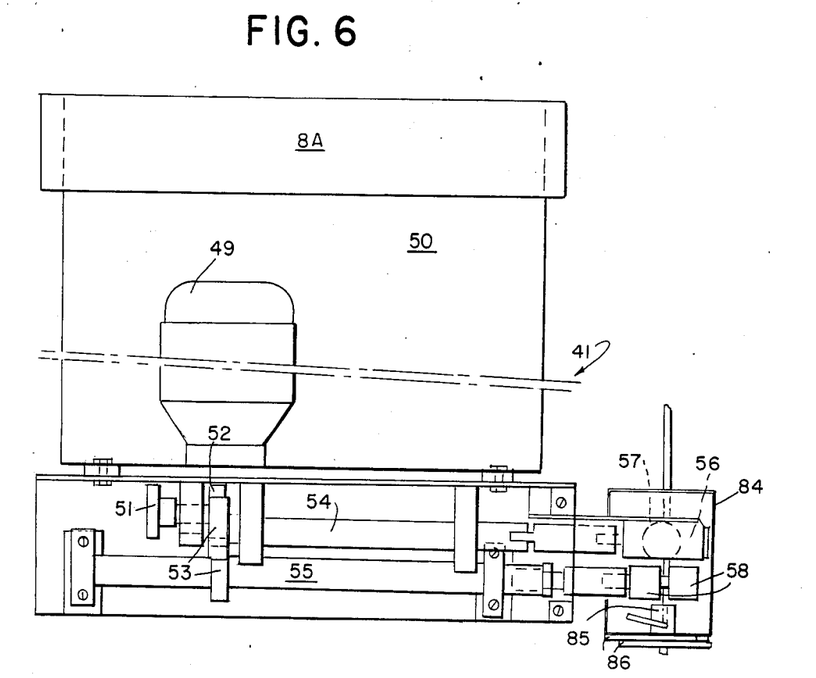
FIGS. 6 and 7 are top and front views, respectively, of the other anti-bending system.
Figure 7:
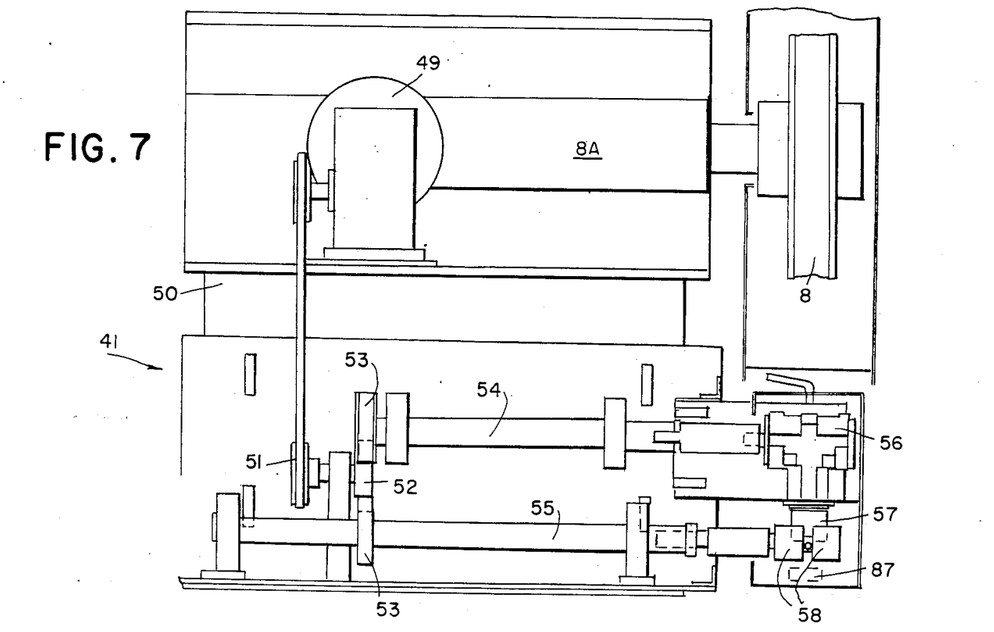

This anti-bending system 41 is constituted as shown in FIGS. 6 and 7 by a moto-reducer 49 fixed on a support 50 connected to the bearing block support 8A and driving in rotation a pulley 51, a toothed wheel 52 fixed to the shaft of the pulley 51, two other toothed wheels 53 meshing with the toothed wheel 52, two shafts 54 and 55 each carrying a toothed wheel 53, an angle gear 56 driven by the shaft 54 and to the output of which is fixed a tungsten ring 57 beneath which bears the wire, and two tungsten rings 58 fixed at the end of the shaft 55 between which passes the wire.

The said wire bears on the planar portion of the tungsten ring 57 at the same level as the lower part of the wire pulley 8. The driving in rotation of the tungsten rings 57 and 58 prevents the formation of a furrow on the said rings.

Advantageously the anti-bending system 41 comprises an adjustment for the pressure of the ring 57 on the wire and for the symmetry of the rings 58 with respect to the said wire.

Moreover, there is similarly provided a water supply to avoid heating of the tungsten rings.

So as to protect the tungsten rings 57 and 58 from abrasive particles at the exit of the wire from the block, a protective casing 84 is disposed on the anti-bending system 41 for protecting rings 57 and 58, which casing carries on its forward portion and interiorly, a small, double-walled tube 85 (the interior wall having small openings) for the dispersion of water serving to cleanse the wire and chill the rings.

On the forward part of the casing 84, but exteriorly, are placed two rubber shields 86 overlapped on the wire so as to prevent abrasive from penetrating to the interior of the casing 84. The anti-bending system 40 may similarly comprise on the entrance side of the wire a casing 84 provided with rubber shields 86.

In this case the object of these latter is to prevent the water serving to chill the wire from, entrained by the wire, washing the entrance of the block and thus interferring with the abrasion, which would result in slowing of the sawing and rupture of the wire.

On the other hand, tests have shown that ascending sawings can be effected. It is unlikely that this process will be widely employed, but it may be found very useful in certain cases.

To attain this result, a fourth tungsten ring 87 may be fixed in this instance beneath the ring 57, while allowing the passage of the wire.

To proceed with an ascending sawing, it is necessary from the very outset to free completely the friction coupling of the automatic descent, then to load the counterweight C so as to give an advantage to this latter with respect to the weight of the movable chassis 2.

Upon inclination of less than 45° in the shape of the guide panel 18, the roller 20 will be pushed in ascent by the movement given to the carriage 4, also driving the movable chassis 2 in upward movement.

It would similarly be possible to ascendingly saw at more than 45°, but this would require the fixation of a ratchet wheel (not shown) coupled to the ratchet wheel of the descent system with teeth opposite those in this latter.

It will be understood that this ascending sawing, as well as a prolonged horizontal sawing, requires a special disposition on the block to be sawed, so as to maintain the abrasive in the sawing stroke.

Thus these anti-bending systems 40 and 41 maintain the wire well in line between the pulleys 8 and permit the realization of profile shapings true to the profile of the guide panel 18.

This wire saw may similarly effect series of helicoidal beams or similar workings.

Figure 11:
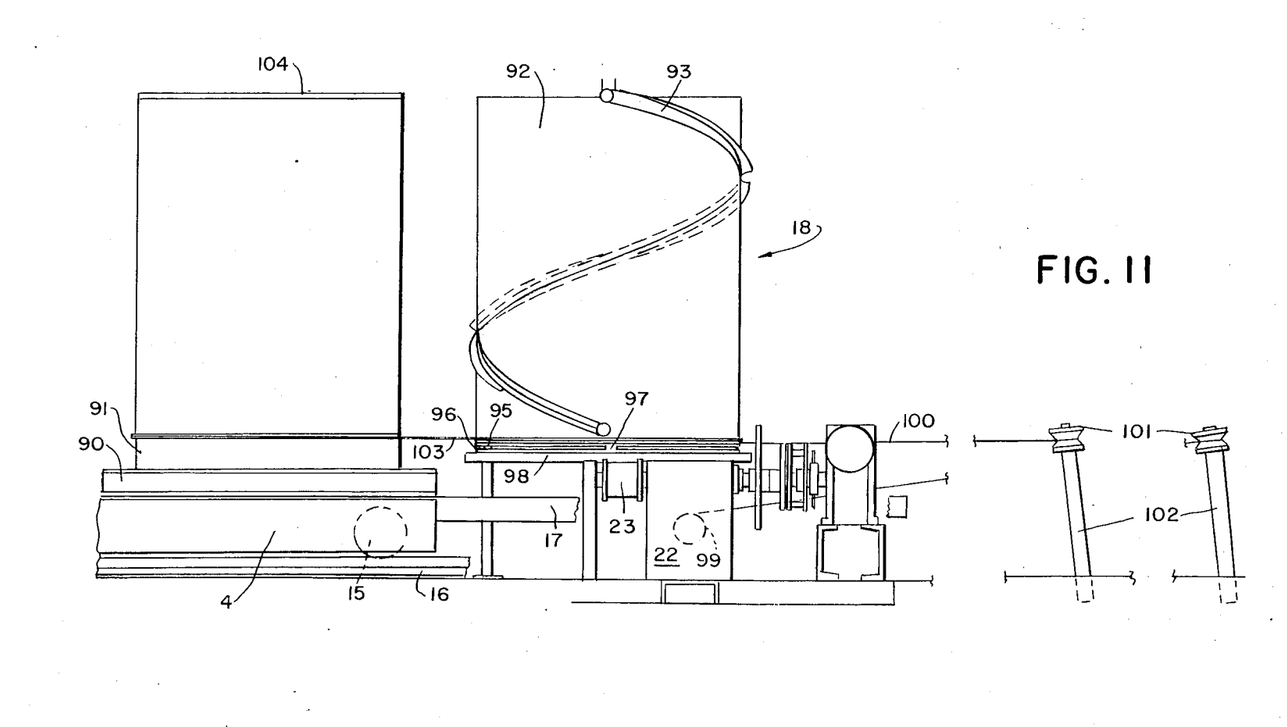
FIGS. 11 and 12 are side and top views, respectively, of the apparatus for effecting helicoidal shafts or similar workings.
Figure 12:
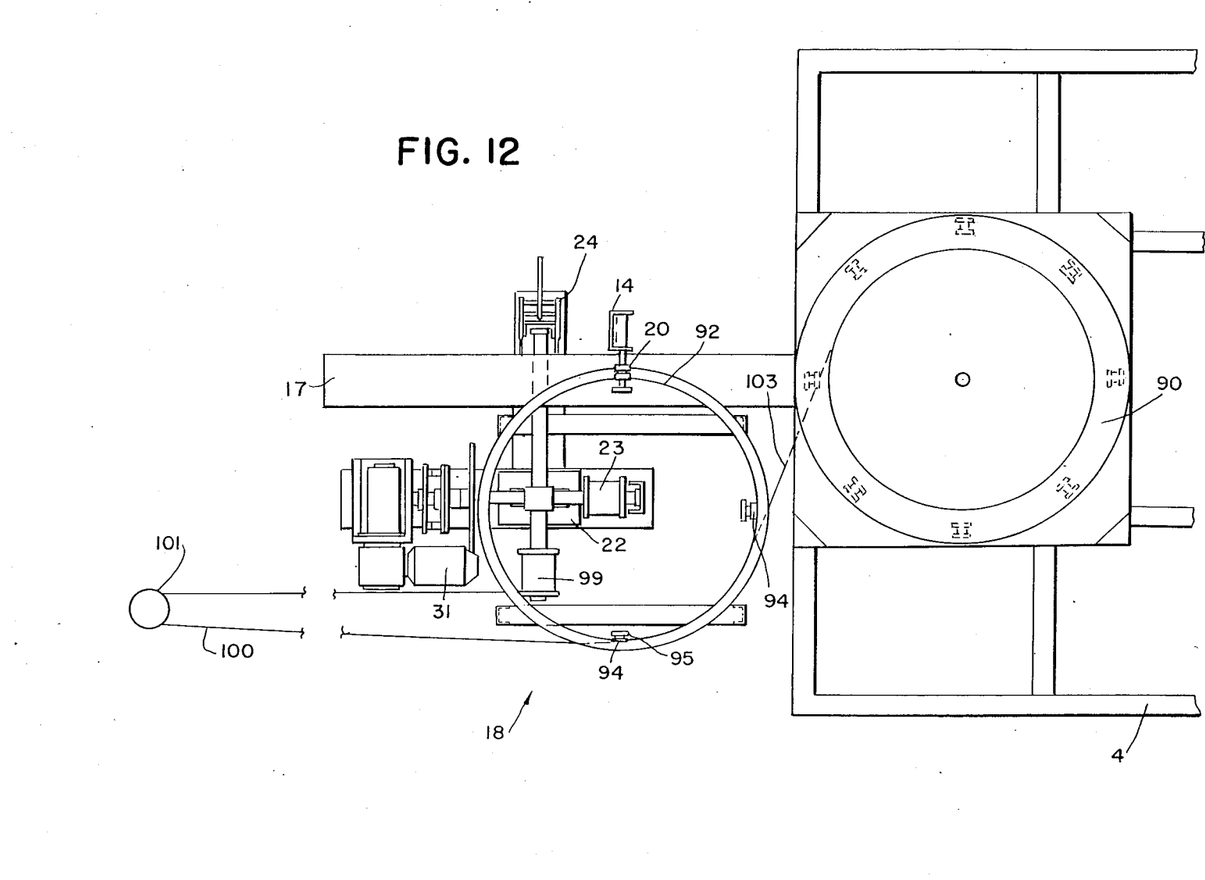

A special apparatus is necessary to do this, as shown in FIGS. 11 and 12.

From the outset, the carriage 4 must be equipped with a preferably removable, turning plate 90. On this turning plate 90 is placed the block to be sawed, which is initially provided with a cylindrical shape by sawing with the wire. The block is mounted on a piece of wood 91 of the same diameter and is well centered on the turning plate 90.

This piece of wood 91 has a thickness which disposes the base of the block at the same height as the end of the coiling course of the coiling track 93 of a guide cylinder 92, replacing in this case the guide panel 18.

This guide cylinder 92 is of a diameter equal to that of the block. It comprises a coiling track 93 shaped as the helicoid which it is desired to obtain. This coiling track 93 is preferably constituted by layers fixed on the guide cylinder 92 by any known means, for example by soldering.

To the interior and at the base of the said guide cylinder are soldered bearings 94 carrying rollers 95 which will circulate on a fixed horizontal metallic platform 96, having a diameter which may be slightly greater than that of the guide cylinder. This latter is driven in rotation about an axle 97 fixed to the center of the platform 96.

This assembly is placed on a support 98 such that it is disposed slightly above the casing of the worm gear 22.

The drive system for the carriage 4 serves to drive the guide cylinder 92 in rotation. The coupling 24 must be disconnected so as not to drive the carriage in translation; this latter must remain fixed. The drum 23 is neutralized by the retreat of cable 21A connecting it to counterweight 21. A drum 99 is fixed on the shaft of the worm wheel of the worm gear 22.

The driving in rotation of guide cylinder 92 is effected by a cable 100 wound two or three times about the lower portion of the said guide cylinder, and connected to the drum 99 while passing through a pulley 101 pivoting on the extremity of a shaft 102 fixed to the ground. A second cable 103 connects the guide cylinder 92 to the piece of wood carrying the block after two or three windings.

The motor 31 being turned on, the cable 100 is wound around drum 99, driving in rotation the guide cylinder 92 which drives with its rotation the turning plate 90 carrying the block to be sawed. The automatic descent is also actuated.

Thus the two movements, rotation of the cylinder and automatic descent, assure, after engagement of the roller 20 placed at the lower portion of guide arm 14 in the coiling track 93 of guide cylinder 92, the sawing of the block according to the shape given to this coiling track. The engagement of the wire in the block must be made at the vertical. It is therefore necessary to descend the first centimeters of sawing in the vertical direction, after which the sawing on the inclined portion is undertaken.

A sheet 104 of stone or granite may be fixed on the upper part of the block so as to effect this operation. The parts issued after sawing are then detached.

By disposing concentric and cylindrical blocks to be sawed on the turning plate, it is possible to obtain more than two helicoidal beams.

Figure 8:
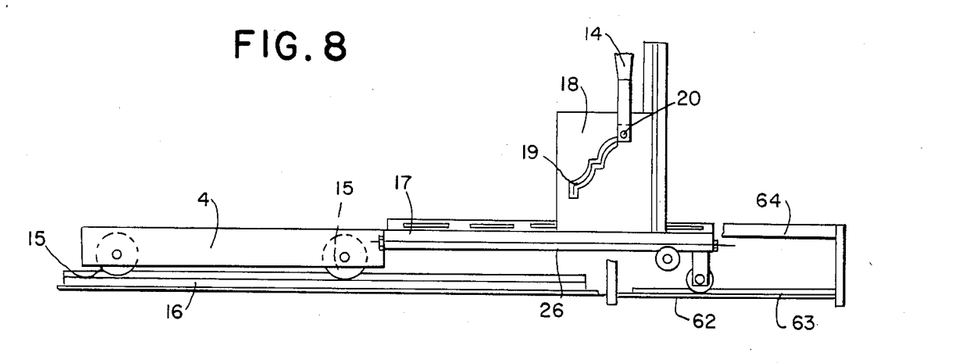
FIGS. 8 and 9 are side and top views showing the guiding of the beam of the block-carrying carriage.
Figure 9:
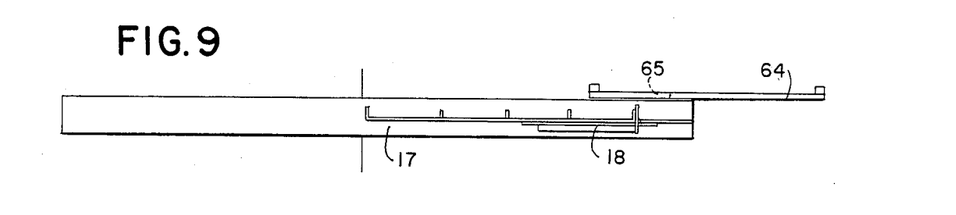

Nevertheless, defects may appear on the shaping obtained by sawing because the lower extremity of the guide arm 14 may undergo lateral displacements in the guide panel 18 due to the thrust of the translation system from the block-carrying carriage 4. So as to avoid this disadvantage and according to an improvement of the invention, the wire saw comprises a roller 59 fixed on the rear part of the guide arm 14 and on the rear face of this latter and a vertical stop 60 fixed in the ground behind guide arm 14, rigidly secured and on the upright of which is fixed a guide 61 in which the roller 59 of the said guide arm may circulate. Any lateral displacement of the guide arm is thus eliminated.

On the other hand and according to another improvement of the invention, so as to guard against any potential flexure of the beam 17 under the thrust of guide arm 14 in automatic descent, a wheel 62 is fixed beneath the beam and comes to bear and circulate on a rail 63.

Moreover, it is essential to assure sufficient retention of the beam in the vertical direction, as this latter may be raised according to the pressure exerted by the displacement system of the block-carrying carriage 4 and the position of the extremity of guide arm 14 in the guide panel 18. So as to eliminate this disadvantage, a horizontal guide 64 is fixed in the ground parallel to the beam 17 and a roller 65 is fixed on the flange of the beam 17 and is adapted to bear and roll on the lower part of the guide 64.

According to another improvement of the wire saw according to the above-referenced U.S. patent application, on at least one upright 5 of the fixed frame 1 in which are provided slides 7 is mounted a protection device for the said slides protecting these latter from abrasive scatterings in the course of sawing.

This protection device is constituted by a roller 66, a protective band 67 having the width of the upright 5, a spring 69 and a counterweight 68.

The roller 66 is fixed beneath the position of the slide block 8A or insertion 39 and on the girder 9 of the movable chassis 2.

The protective band 67 is fixed on the lower extremity of an upright 5 of the fixed frame 1.

This band 67 unwinds in proportion to the ascent of the movable chassis 2 and is wound during the descent of the said movable chassis with the aid of the spring 69 and counter-weight 68. Preferably this protection device is fixed on the upright 5 of the fixed frame 1 disposed with respect to the exit of the wire from the block to be sawed, that is to say with respect to where the abrasive scatterings take place.

But it goes without saying that the said device may be fixed on both sides of the fixed frame 1.

The improvements according to the present invention of the wire saw that is the object of the U.S. patent application permit obtaining very great precision in the form of the shapings with a decrease in price of manufacture of the said shapings because of the great productive capacity.

It goes without saying that the present invention may receive any arrangements and variations in the domain of equivalent techniques without departing whatsoever from the scope of the present patent.

I claim:

1. Improvements in a wire saw for shaping stone, granite and the like comprising a fixed vertical frame (1) in which is displaced a movable chassis (2) in vertical translation, said movable chassis (2) carrying wire pulleys (8), and a block-carrying carriage (4) movable in horizontal translation beneath the fixed frame (1) and comprising a vertical guide panel (18) in which is displaced the extremity of a guide arm (14) fixed to the vertical movable chassis (2), characterized in that the block-carrying carriage (4) is provided, for its displacement, with mechanical means actuated by a counterweight (21) and a variable speed, mechanical automatic advance system coupled to the said mechanical means so as to impart to the displacement of the said carriage a maximum speed according to the machining characteristics of the material to be sawed.

2. Improvements according to claim 1 on the mechanical means actuated by a counterweight (21) and comprising a worm gear (22), a drum (23) fixed to the shaft of the worm of the said worm gear and on which is wound a cable (21A) supporting the counterweight (21) by a drive device for the carriage (4) fixed on the shaft of the worm wheel of the worm gear (22) and by a coupling (24) mounted on the shaft of the said worm wheel for disengaging the drive device of the carriage from the worm gear, characterized in that the drive device of the carriage (4) is constituted by a drum (25) mounted through bearings on the shaft of the worm wheel of the worm gear (22) and cooperating with the coupling (24) and by a cable (26) wound on the drum (25) and fixed by its extremities on the extremities of the beam (17).

3. Improvements according to claim 1 characterized in that the mechanical automatic advance system coupled to the shaft of the worm of the worm gear (22) is constituted by a motor (31) coupled to a reducer (32) the output shaft of which is coaxial with the shaft of the worm of the worm gear (22), by a friction coupling (33)

one part of which is slidably mounted on the reducer shaft (32) and by a disc (34) fixed on the worm shaft.

4. Improvements according to claim 1 characterized in that between the wire pulleys (8) carried by the arm (13) and the block to be sawed are disposed anti-bending systems (40) and (41) which allow maintaining the wire in line during sawing.

5. Improvements according to claim 4 characterized in that the anti-bending system (40) disposed with respect to the entrance of the sawing wire in the block to be sawed is constituted of a small vertical plate (42) beneath which bears the wire, two lateral small plates (43) symmetrically disposed about the small plate (42) and perpendicular to this latter, a small plate support (44) mounted on a stage (45) fixed on an angle iron (46) and a plate (47) fixed on the support of the bearing block (8A) and on which is mounted the angle iron (46).

6. Improvements according to claim 5 characterized in that the angle iron (46) is adjustable in height and the stage (45) is adjustable according to its longitudinal direction so as on the one hand to adjust the pressure of the small plate (42) on the sawing wire and on the other hand to dispose the small plates (43) symmetrically about the said wire.

7. Improvements according to claim 4 characterized in that the anti-bending system (41) near the exit of the wire from the block is constituted by a motor (49) fixed on a support (50) connected to the bearing block (8A) driving in rotation a pulley (51), by a toothed wheel (52) fixed to the shaft of the pulley (51), by two other toothed wheels (53) meshing with the toothed wheel (52) and each driving a shaft (54) and (55), by an angle gear (56) driven in rotation by the shaft (54) and at the output of which is fixed a ring (57) beneath which bears the wire and by two rings (58) fixed at the end of the shaft (55) and between which passes the wire.

8. Improvements according to claim 4 characterized in that the anti-bending systems (40) and (41) are disposed in protective casings (84) containing a cleansing tube (85) and carrying screens (86) overlapping on the wire so as, on the entrance side of the wire into the block, to prevent water entrained by the said wire from rinsing the entrance of the said block and, on the exit side of the wire from the block, prevent abrasive from entering the interior of the casing.

9. Improvements according to claim 5 characterized in that the small plates (42) and (43) and the rings (57) and (58) are of tungsten.

10. Improvements according to claim 1 characterized in that the wire saw comprises means for maintaining the guiding the guide arm (14) so as to prevent lateral displacements of this latter in the guide panel (18).

11. Improvements according to claim 10 characterized in that the means for guiding and maintaining the guide arm (14) are constituted by a bearing (59) fixed on the lower part of the guide arm and on the rear face of this latter and by a vertical stop (60) fixed in the ground behind the guide arm (14) and on the upright of which is fixed a guide (61) in which the bearing (59) may circulate.

12. Improvements according to claim 1 characterized in that beneath the beam (17) is fixed a wheel (62) which comes to bear and circulate on a rail (63) so as to eliminate any possible flexure of the beam (17) under the thrust of the guide arm (14).

13. Improvements according to claim 1 characterized in that a horizontal guide (64) is fixed in the ground parallel to the beam (17) and a bearing (65) is fixed on the flange of the beam (17) and comes to bear and roll on the lower part of the guide (64) so as to prevent the raising of the beam (17) at the time of its displacement.

14. Improvement according to claim 1 characterized in that on at least one of the uprights (5) of the fixed frame (1) in which are provided the slides (7) is mounted a protection device for the said slides protecting these latter from abrasive scatterings during sawing.

15. Improvements according to claim 14 characterized in that the protection device is constituted by a roller (66) fixed on the movable chassis (2), a protective band (67) having the same width as upright (5) and fixed at one of its extremities to the lower extremity of the upright (5), a spring (69) and a counterweight (68).

* * * * *